(12) United States Patent
Herhusky et al.

(10) Patent No.: US 10,745,013 B1
(45) Date of Patent: Aug. 18, 2020

(54) METHODS AND SYSTEMS FOR ENGINE IDLE STOP

(71) Applicant: Ford Global Technologies, LLC, Dearborn, MI (US)

(72) Inventors: Nicholas Herhusky, Dearborn, MI (US); Scott Steadmon Thompson, Belleville, MI (US); John Eric Rollinger, Troy, MI (US); Vincent Martinez, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/440,514

(22) Filed: Jun. 13, 2019

(51) Int. Cl.
*B60W 30/18* (2012.01)
*F02D 33/00* (2006.01)
*B60W 50/029* (2012.01)

(52) U.S. Cl.
CPC ......... *B60W 30/181* (2013.01); *F02D 33/006* (2013.01); *B60W 2050/0295* (2013.01); *B60W 2510/0642* (2013.01)

(58) Field of Classification Search
CPC ....... B60W 30/181; B60W 2050/0295; B60W 2510/0642; F02D 33/006
See application file for complete search history.

(56) References Cited

U.S. PATENT DOCUMENTS

| 4,574,752 | A | | 3/1986 | Reichert, Jr. et al. | |
|---|---|---|---|---|---|
| 5,198,698 | A | * | 3/1993 | Paul | H02J 9/08 307/46 |
| 7,312,964 | B2 | | 12/2007 | Tchemobrivets | |
| 7,558,666 | B2 | * | 7/2009 | DiGonis | B60W 10/06 701/112 |
| 2002/0079853 | A1 | * | 6/2002 | Schmitz | B60L 3/0061 318/434 |
| 2004/0261831 | A1 | * | 12/2004 | Tsuneoka | B60H 1/2212 136/205 |
| 2008/0201064 | A1 | * | 8/2008 | DiGonis | F02N 11/0822 701/110 |
| 2010/0133025 | A1 | * | 6/2010 | Flett | B60K 6/42 180/65.22 |
| 2011/0049881 | A1 | * | 3/2011 | Ranier | F02N 11/101 290/31 |
| 2014/0136038 | A1 | * | 5/2014 | Bissontz | B60L 58/22 701/22 |
| 2015/0159613 | A1 | | 6/2015 | Jensen et al. | |
| 2015/0192632 | A1 | | 7/2015 | Crosman, III et al. | |
| 2017/0107925 | A1 | | 4/2017 | Sutton | |
| 2018/0344545 | A1 | | 12/2018 | Khafagy et al. | |

OTHER PUBLICATIONS

Herhusky, N. et al., "Method for Operating a Vehicle Having an Electrical Outlet," U.S. Appl. No. 16/562,287, Filed Sep. 5, 2019, 40 pages.

* cited by examiner

*Primary Examiner* — Hung Q Nguyen
(74) *Attorney, Agent, or Firm* — Geoffrey Brumbaugh; McCoy Russell LLP

(57) ABSTRACT

Methods and systems are provided for adjusting engine idle-stop based on operation of an on-board generator. In one example, during operation of the generator to power an external load, a method may include inhibiting engine shut-down based on input from a user.

20 Claims, 5 Drawing Sheets

METHODS AND SYSTEMS FOR ENGINE IDLE STOP

FIELD

The present description relates generally to methods and systems for controlling idle stop of a vehicle engine based on operation of an on-board generator.

BACKGROUND/SUMMARY

Passenger vehicles, light trucks, and heavy duty trucks may in some examples include an ability to support 110V-120V alternating current (AC) and 220V-240V AC electrical loads. As an example, such vehicles may support electrical loads (power take-off device) up to around 450 Watts, and in the future may support electrical loads from 2 KW-8 KW and potentially higher (e.g. 16 KW and greater). Systems for such vehicles may include designs for directly supporting such appliances either while the vehicle is stationary, for example for use at a job site or for supplying electricity to home electrical loads, or while the vehicle is moving, for example to power a refrigeration unit. Such systems may comprise direct current (DC) to AC systems, and may be referred to as a power to the box (Pt.) system. Such Pt. systems may be driven either by an alternator, a belt-integrated starter generator (BISG) driven by the engine or by a high voltage battery (e.g. 300V-350V) which is in turn charged by a crank ISG (CISG).

Various approaches are provided for operating a device (electric load) using power generated from engine operation. In one example, as shown in US 20180344545, Khadafy et al. teaches operation of a lifting mechanism such as a ramp and chairlift using power from an on-board battery. An on-board generator generates electrical energy from engine torque which is stored in the battery. During operation of the lifting mechanism, even if all conditions are met for initiating an engine idle stop, the idle stop may be delayed until completion of the operation of the lifting mechanism.

However, the inventors herein have recognized potential issues with such systems. As one example, multiple operations of a power take-off (PTO) device may take place successively and by idle-stopping the engine after completion of the first operation of the PTO, subsequent operations of the PTO may be disrupted. Further, the PTO operation may be optional for the operator and he may not desire operation of the PTO device when conditions are met for idle stop. Also, indefinite delaying of engine idle-stopping for PTO operation may not be desired by the operator.

In one example, the issues described above may be addressed by a method for a vehicle comprising: during operation of a generator, in response to a condition for an engine idle-stop being met, schedule engine shut-down based on input from a user. In this way, based on user input, engine idle-stop operations may be better coordinated with generator operation.

As an example, power generated by a generator driven by the engine may be used to operate a power take off device such as a cement mixer, a trash compactor, a harvester, a snow ploughs, mobility device, etc. During operation of the PTO device, the generator is operated to convert mechanical energy (from engine torque) to electrical energy for charging the battery. In response to conditions being met for an engine idle-stop, if a generator is not operational, the engine may be idle-stopped until conditions are met for engine restart. In response to conditions being met for an engine idle-stop, if a generator is in operation, the user may be prompted to select if the engine would be stopped or continued to operate (override idle-stop). The idle-stop override may be continued until the generator operation stops and the vehicle moves. The user may also select an option to override idle-stop for a specific time period after which irrespective of generator operation, the engine may be stopped if conditions for idle-stop continue to be met.

In this way, during generator operation, by scheduling idle-stop based on operator input, operation of a PTO device may be effectively continued without interruption due to power shortage caused by engine shut-down. By continuing to operate the engine until the vehicle moves, successive operation of the PTO may be supported. The technical effect of allowing the operator to select a specific duration for idle-stop override is that the operator may operate the PTO device for a desired duration and then allow engine idle-stop which would improve fuel efficiency. Overall, by adjusting generator operation and engine idle-stop based on operator input, customer satisfaction may be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
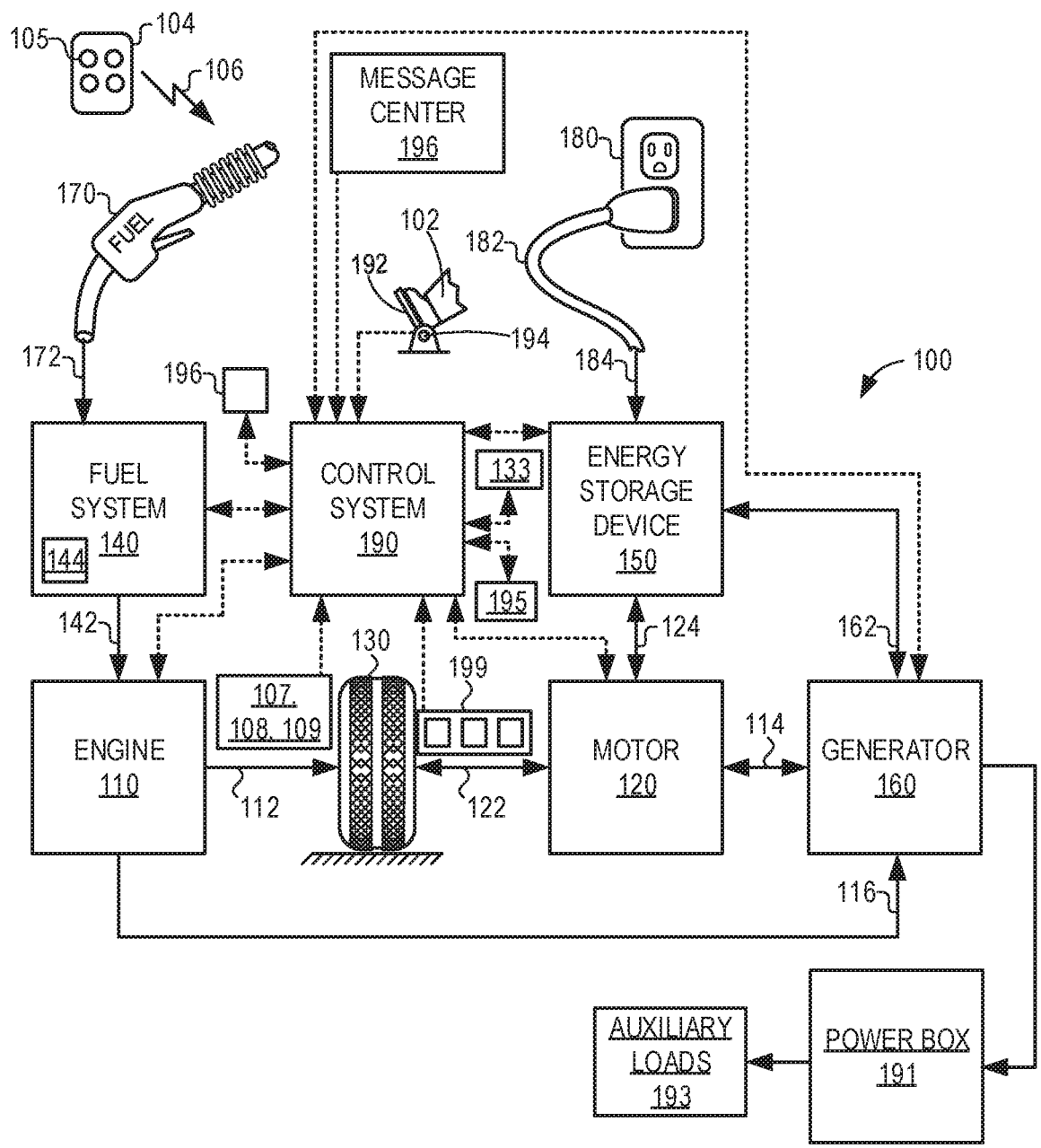
FIG. 1 schematically shows an example vehicle propulsion system.
Figure 2:
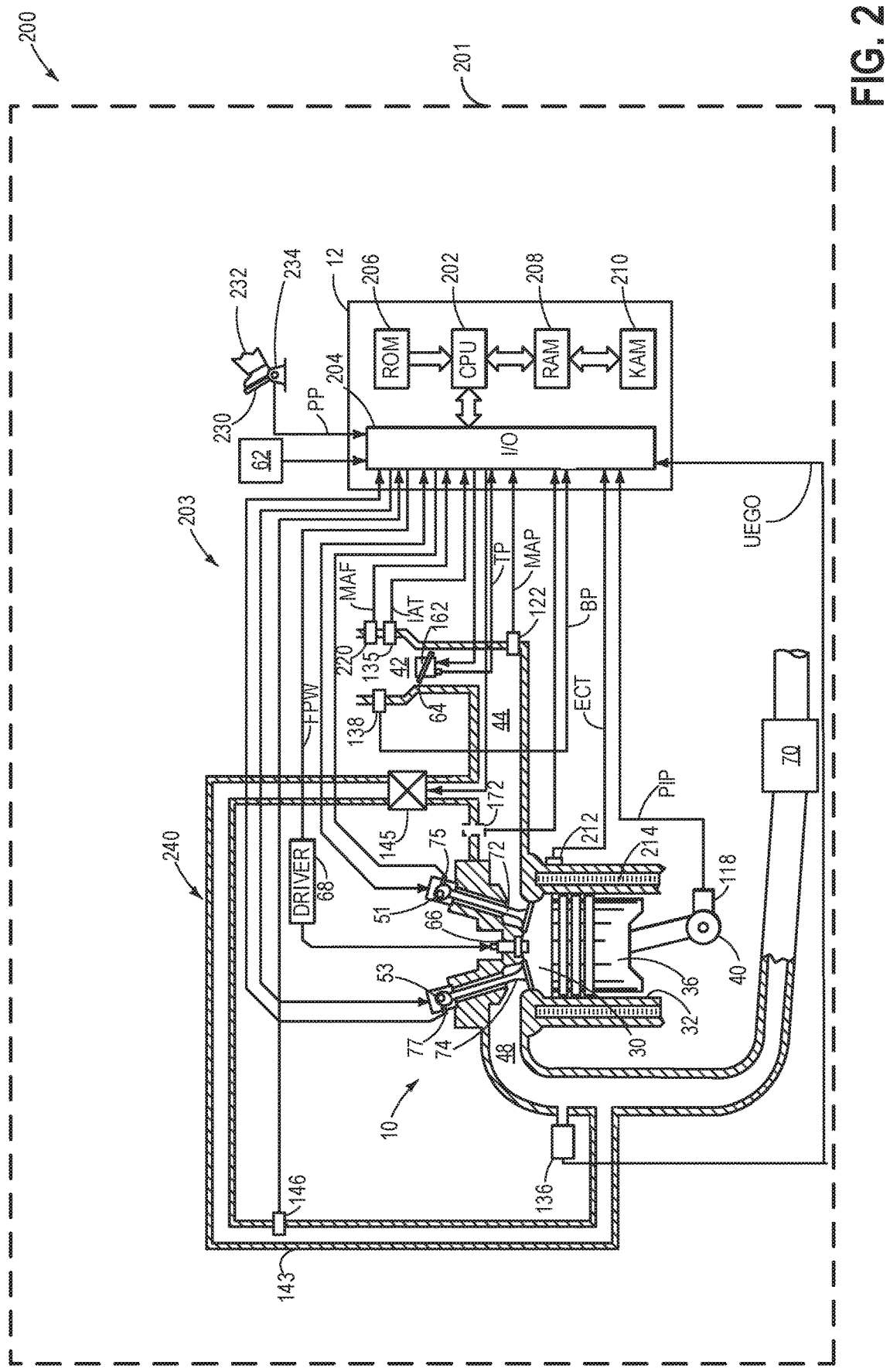
FIG. 2 shows an example engine system of the vehicle propulsion system.

The following description relates to systems and methods for adjusting idle stop of a vehicle engine based on operation of an on-board generator for powering external loads (referred to herein as power-to-the-box mode or PttB mode). Vehicle systems that include an onboard power box that may receive power from engine operation, such as the vehicle system depicted at FIG. 1. An example engine system of the vehicle system of FIG. 1 is shown in FIG. 2. An engine controller may be configured to perform control routine, such as example routines of FIG. 3 to schedule an engine idle-stop during operation of the generator, based on user input. In one example, the shutdown is scheduled only responsive to receiving specific input from the user, unless and until the generator output to an accessory, such as in a truck bed, is reduced and/or discontinued. The user input may be received via a human machine interface (HMI) shown in FIG. 4. An example operation of the engine and the generator based on the user input is shown in FIG. 5.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e. set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Vehicle propulsion system 100 may include a power box 191 which may receive power from generator 160. Power box 191 may include one or more alternating current (AC) and/or direct current (DC) power outlets for performing tasks including but not limited to powering power tools at work sites, powering lighting, powering outdoor speakers, powering water pumps, supplying power in situations including emergency power outage, powering tailgating activities, powering RV camping activities, etc. In other words, the AC and/or DC power outlets of power box 191 may be used to power auxiliary electrical loads 193 (power take-off devices), for example loads external to the vehicle. The power outlets may be external to a cabin of the vehicle (e.g. bed of truck) and/or internal to the cabin of the vehicle.

Generator 160 may comprise an onboard full sine wave inverter. For providing power via power box 191, generator 160 may receive energy via the energy storage device 150 in some examples, where DC power is converted via the generator 160 to AC power for powering power box 191 under situations where AC power is desired. Additionally or alternatively, the engine 110 may be activated to combust air and fuel in order to generate AC power via generator 160 for powering power box 191. The vehicle operator 102 may utilize vehicle instrument panel 196 (such as a human machine interface), which may include input portions for receiving operator input, for controlling power box 191. In an alternate embodiment, in addition to generator 160, an additional generator coupled to the engine may be used to power the power box 191.

Discussed herein, to power auxiliary electrical loads, the vehicle operator 102 may select a mode of operation via the vehicle instrument panel termed "power to the box" or PttB mode. In the PttB mode, power from the generator 160 may be utilized to operate an off-board auxiliary load 193. For example, the vehicle operator may select PttB mode via the vehicle instrument panel, and may further select an engine speed (revolutions per minute or RPM) that the engine may run at for powering the power box 191.

During operation in the PttB mode, in response to the condition for an engine idle-stop being met, input from a user may be requested via a human machine interface (HMI), the HMI including a display coupled to a vehicle dashboard and/or a display of a smart phone operated by the user. The condition for the engine idle-stop includes a higher than threshold duration of engine idling with the vehicle stopped at the current location. Based on a first input from the user, operation of an engine may be continued without engine shut-down until the generator is deactivated and the vehicle is moved from an origin location. Based on a second input from the user, the engine may be shut down while based on a third input from the user, engine operation may be continued without engine shut-down for an indicated duration, and then upon completion of the indicated duration, the engine may be shut down. The first input, the second input, and the third input are received in response to prompting the user for the input via the HMI. As such, the user may indicate any one (not multiple) of the first input, the second input, and the third input at one time. In this way, by scheduling engine idle-stop based on generator operation and user input, power delivery to auxiliary loads may be continued as desired.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. For example, control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal or an accelerator pedal. Furthermore, in some examples control system 190 may be in communication with a remote engine start receiver 195 (or transceiver) that receives wireless signals 106 from a key fob 104 having a remote start button 105. In other examples (not shown), a remote engine start may be initiated via a cellular telephone, or smartphone based system where a user's cellular telephone sends data to a server and the server communicates with the vehicle to start the engine.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (PHEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include sensors dedicated to indicating the occupancy-state of the vehicle, for example seat load cells 107, door sensing technology 108, and onboard cameras 109. Vehicle propulsion system 100 may also include inertial sensors 199. Inertial sensors may comprise one or more of the following: longitudinal, latitudinal, vertical, yaw, roll, and pitch sensors. The vehicle instrument panel 196 may include indicator light(s) and/or a text-based display in which messages are displayed to an operator. In some examples, vehicle instrument panel 196 may include a speaker or speakers for additionally or alternatively conveying audible messages to an operator. The vehicle instrument panel 196 may also include various input portions for receiving an operator input, such as buttons, touch screens, voice input/recognition (which may include a microphone), etc.

In some examples, vehicle system 100 may include lasers, radar, sonar, and/or acoustic sensors 133, which may enable vehicle location, traffic information, etc., to be collected via the vehicle. In one example, discussed in further detail below, one or more of sensors 133 may be used to infer a situation where the vehicle is in an environment of reduced air exchange (as compared to, for example, a situation where the vehicle is traveling on an open road or is parked outside).

FIG. 2 is a schematic diagram showing a vehicle system 200 comprising a vehicle 201 and an engine system 203. The vehicle system 201 may be the vehicle system 100 of FIG. 1 and the engine system 203 may be the engine 110 of FIG. 1. FIG. 2 shows one cylinder of a multi-cylinder engine 10 in the engine system 203. The engine 10 may be controlled at least partially by a control system including a controller 12 and by input from a vehicle operator 232 via an input device 230. In this example, the input device 230 includes an accelerator pedal and a pedal position sensor 234 for generating a proportional pedal position signal PP. A combustion chamber (cylinder) 30 of the engine 10 may include combustion chamber walls 32 with a piston 36 positioned therein. The piston 36 may be coupled to a crankshaft 40 so that reciprocating motion of the piston is translated into rotational motion of the crankshaft. The crankshaft 40 may be coupled to at least one drive wheel of a vehicle via an intermediate transmission system. Further, a starter motor may be coupled to the crankshaft 40 via a flywheel to enable a starting operation of the engine 10. A position of the crankshaft may be determined via a Hall effect sensor (crankshaft signal sensor) 118 coupled to the crankshaft 40. In one example, the sensor 118, which is also used as an engine speed sensor, may produce a predetermined number of equally spaced pulses every revolution of the crankshaft.

The combustion chamber 30 may receive intake air from an intake manifold 44 via an intake passage 42 and may exhaust combustion gases via an exhaust passage 48. The intake manifold 44 and the exhaust passage 48 can selectively communicate with the combustion chamber 30 via respective intake valve 72 and exhaust valve 74. In some embodiments, the combustion chamber 30 may include two or more intake valves and/or two or more exhaust valves.

In this example, the intake valve 72 and exhaust valve 74 may be controlled by cam actuation via respective cam actuation systems 51 and 53. The cam actuation systems 51 and 53 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 72 and exhaust valve 74 may be determined by position sensors 75 and 77, respectively. In alternative embodiments, the intake valve 72 and/or exhaust valve 74 may be controlled by electric valve actuation. For example, the combustion chamber 30 may alternatively include an intake valve controlled via electric valve actuation and an exhaust valve controlled via cam actuation including CPS and/or VCT systems.

A fuel injector 66 is shown coupled directly to combustion chamber 30 for injecting fuel directly therein in proportion to the pulse width of signal FPW received from the controller 12 via an electronic driver 68. In this manner, the fuel injector 66 provides what is known as direct injection of fuel into the combustion chamber 30. The fuel injector may be mounted in the side of the combustion chamber or in the top of the combustion chamber (as shown), for example. Fuel may be delivered to the fuel injector 66 by a fuel system (not shown) including a fuel tank, a fuel pump, and a fuel rail. In some embodiments, the combustion chamber 30 may alternatively or additionally include a fuel injector arranged in the intake manifold 44 in a configuration that provides what is known as port injection of fuel into the intake port upstream of the combustion chamber 30.

The intake passage 42 may include a throttle 162 having a throttle plate 64. In this particular example, the position of throttle plate 64 may be varied by the controller 12 via a signal provided to an electric motor or actuator included with the throttle 162, a configuration that is commonly referred to as electronic throttle control (ETC). In this manner, the throttle 162 may be operated to vary the intake air provided to the combustion chamber 30 among other engine cylinders. The position of the throttle plate 64 may be provided to the controller 12 by a throttle position signal TP. The air intake passage 42 may include the intake air temperature (IAT) sensor 135 and the barometric pressure (BP) sensor 138. The IAT sensor 135 estimates intake air temperature to be used in engine operations and provides a signal to the controller 12. Similarly, the BP sensor 138 estimates the ambient pressure for engine operations and provides a signal to the controller 12. The intake passage 42 may further include a mass air flow sensor 220 and a manifold air pressure sensor 122 for providing respective signals MAF and MAP to the controller 12.

An exhaust gas sensor 136 is shown coupled to the exhaust passage 48 upstream of an emission control device 70. The sensor 136 may be any suitable sensor for providing an indication of exhaust gas air/fuel ratio (AFR) such as a linear oxygen sensor or UEGO (universal or wide-range exhaust gas oxygen), a two-state oxygen sensor or EGO, a HEGO (heated EGO), a NOx, HC, or CO sensor.

The emission control device 70 is shown arranged along the exhaust passage 48 downstream of the exhaust gas sensor 136. The device 70 may be a three-way catalyst (TWC), NOx trap, various other emission control devices, or combinations thereof. In some embodiments, during operation of the engine 10, the emission control device 70 may be periodically reset by operating at least one cylinder of the engine within a particular air/fuel ratio.

Further, an exhaust gas recirculation (EGR) system 240 may route a desired portion of exhaust gas from the exhaust passage 48 to the intake manifold 44 via an EGR passage 143. The amount of EGR provided to the intake manifold 44 may be varied by the controller 12 via an EGR valve 145. Further, an EGR sensor 146 may be arranged within the EGR passage 143 and may provide an indication of one or more of pressure, temperature, and constituent concentration of the exhaust gas. A linear oxygen sensor 172 may be positioned at the intake passage, downstream of the intake throttle, to facilitate EGR regulation. Under some conditions, the EGR system 240 may be used to regulate the temperature of the air and fuel mixture within the combustion chamber, thus providing a method of controlling the timing of ignition during some combustion modes. Further, during some conditions, a portion of combustion gases may be retained or trapped in the combustion chamber by controlling exhaust valve timing, such as by controlling a variable valve timing mechanism.

The controller 12 is shown in FIG. 2 as a microcomputer, including a microprocessor unit 202, input/output ports 204, an electronic storage medium for executable programs and calibration values shown as read only memory chip 206 in this particular example, random access memory 208, keep alive memory 210, and a data bus. The controller 12 may receive various signals from sensors coupled to the engine 10, in addition to those signals previously discussed, including measurement of exhaust and intake AFR from oxygen sensors 126 and 172 respectively, inducted mass air flow (MAF) from the mass air flow sensor 220; engine coolant temperature (ECT) from a temperature sensor 212 coupled to a cooling sleeve 214; a profile ignition pickup signal (PIP) from a Hall effect sensor 118 (or other type) coupled to crankshaft 40; throttle position (TP) from a throttle position sensor; and absolute manifold pressure signal, MAP, from the sensor 122. Engine speed signal, RPM, may be generated by the controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque.

The storage medium read-only memory 206 can be programmed with computer readable data representing non-transitory instructions executable by the processor 202 for performing the methods described below as well as other variants that are anticipated but not specifically listed. As described above, FIG. 2 shows one cylinder of a multi-cylinder engine, and each cylinder may similarly include its own set of intake/exhaust valves, fuel injector, spark plug, etc.

The controller 12 receives signals from the various sensors of FIG. 1 and employs the various actuators of FIG. 1 to adjust engine operation based on the received signals and instructions stored on a memory of the controller 12. In one example, in response to a lower than threshold engine load for a longer than threshold duration, the controller may initiate an engine idle-stop by sending a signal to the fuel injectors 66 to suspend engine cylinder fuel injection.

During conditions when the operator torque demand decreases to below a threshold, such as when the vehicle is stopped at a traffic signal, the engine may idle until the torque demand increases. Prolonged idling may adversely affect fuel economy and emissions quality. In response to engine idle-stop conditions being met, an automatic start-stop (herein also referred to as engine idle-stop) operation may be carried out to reduce the duration of engine idling. For example, if it is determined that the engine has been idling for longer than a threshold duration, combustion may be suspended (by deactivating fuel and spark to engine cylinders), and engine operation may be stopped (idle-stop). In response to engine restart conditions being met, the engine may be restarted (idle-start) and combustion may be resumed.

If auxiliary loads (also referred herein as power take-off device) are coupled to a power box (such as power box 191 in FIG. 1) of the vehicle system and is powered by operating a generator, an engine idle-stop may interrupt the PTO operation. Therefore, under such circumstances, the controller may seek user response via a human machine interface (HMI) and in response to the user overriding an engine idle-stop, engine operation may be maintained; and in response to the user not overriding the engine idle-stop, fueling and spark to engine cylinders may be suspended to shut down engine. Details of scheduling an engine idle-stop during operation of a generator is discussed in relation to FIG. 3.

In this way, the system of FIGS. 1 and 2 enable a system for a vehicle comprising: a controller with computer readable instructions stored on non-transitory memory to: during operation of an on-board generator to power one or more loads external to the vehicle, after a threshold duration of engine idling with the vehicle being stationary, seeking user response via a human machine interface (HMI), in response to the user overriding an engine idle-stop, maintaining engine operation, and in response to the user not overriding the engine idle-stop, suspending fueling and spark to engine cylinders to shut down engine.

Figure 3:
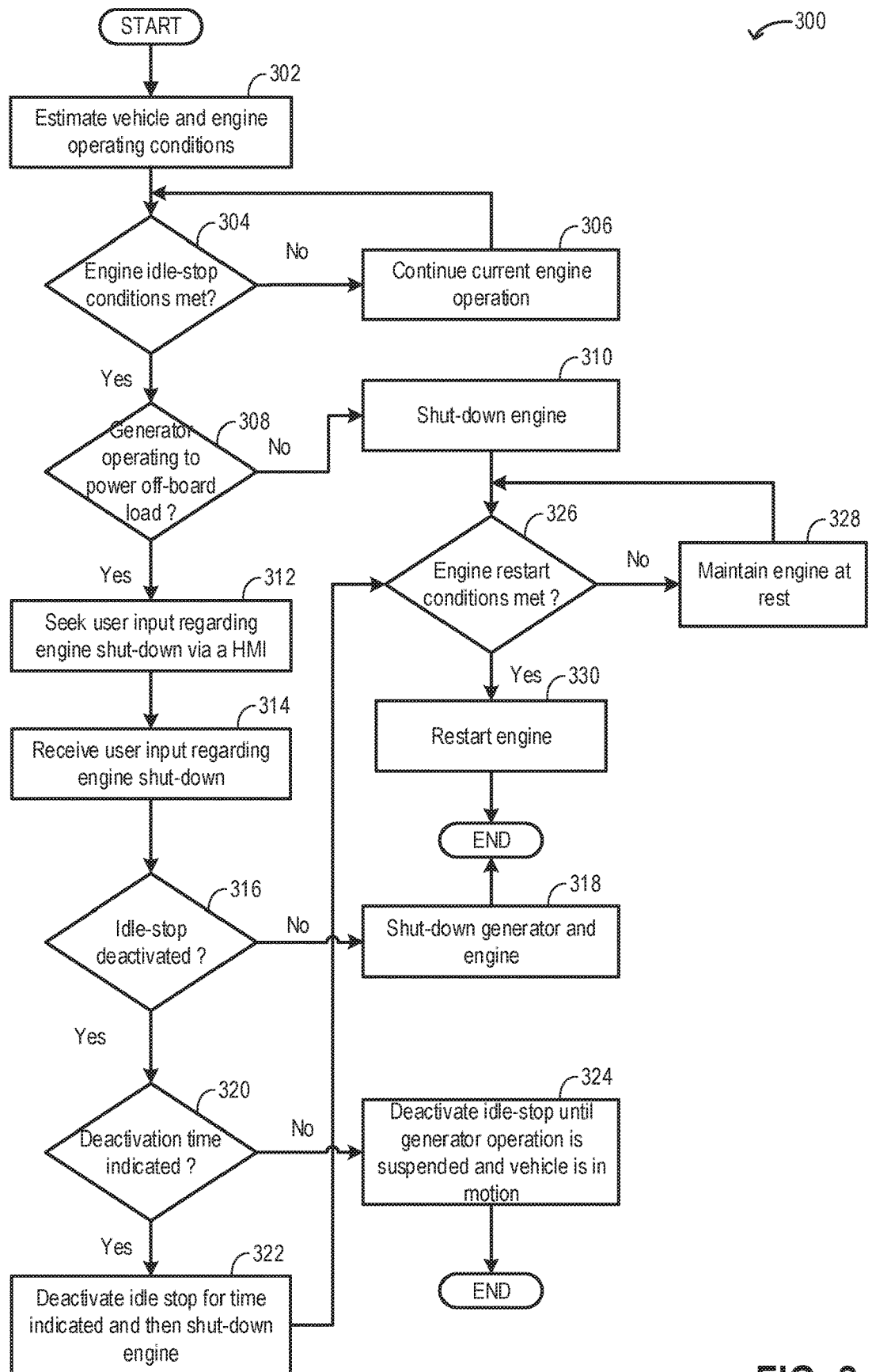
FIG. 3 shows a flow chart illustrating an example method that can be implemented to schedule engine idle-stop during operation of a generator.

FIG. 3 shows an example method 300 for adjusting an operation of each of the engine system of a vehicle in response to engine idling conditions being met and operation of a generator. Instructions for carrying out method 300 and the rest of the methods included herein may be executed by a controller based on instructions stored on a memory of the controller and in conjunction with signals received from sensors of the engine system, such as the sensors described above with reference to FIGS. 1 and 2. The controller may employ engine actuators of the engine system to adjust engine operation, according to the methods described below.

At 302, current vehicle and engine operating conditions may be estimated and/or measured. These may include, for example, operator torque demand, engine speed, vehicle speed, engine temperature, engine load, ambient conditions (such as ambient humidity, temperature, and barometric pressure), exhaust temperature, manifold pressure, manifold air flow, battery state of charge, etc. Also, operation of an on-board generation (such as generator 160 in FIG. 1) may be estimated.

At 304, the routine includes determining if engine idle-stop conditions are met. In one example, conditions for engine idle-stop may include engine idling for a longer than threshold duration. Engine idling may take place while the vehicle is at a traffic stop when the engine load is below a threshold (such as when the vehicle is stationary). Engine operation at the idling speed for a longer than threshold duration may result in increased fuel usage and increased level of exhaust emissions. The threshold duration may be based on fuel level in the fuel tank. As an example, if the fuel level in the fuel tank is lower than a threshold level, the threshold duration may be decreased such that additional fuel may not be consumed for engine idling. In another example, conditions for engine idle-stop may include vehicle operation at a lower than threshold vehicle speed with brake being applied. Idle-stop during conditions when the vehicle speed is non-zero may be referred to as rolling idle-stop, such as when the vehicle is coasting with the operator foot off the pedal.

Engine idle-stop conditions may further include a greater than threshold battery state of charge (SOC). The controller may check battery SOC against a preset minimum threshold and if it is determined that the battery SOC is at least more that 30% charged, automatic engine stop may be enabled. The status of an air conditioner may be checked and before initiating an engine idle-stop, it may be verified that the air conditioner did not issue a request for restarting the engine, as may be requested if air conditioning is desired. In one example, air conditioning may be desired if a temperature in the vehicle cabin increases above a desired temperature as indicated by the operator. In another example, the operator may initiate operation of the air conditioner by sending a command to the controller via a dashboard switch. The intake air temperature may be estimated and/or measured to determine if it is within a selected temperature range. In one example, the intake temperature may be estimated via a temperature sensor located in the intake manifold and an engine idle-stop may be initiated when the intake air temperature is above a threshold temperature. Also, the engine temperature may be estimated and/or measured to determine if it is within a selected temperature range. In one example, the engine temperature may be inferred from an engine coolant temperature and an engine idle-stop may be initiated when the engine coolant temperature is above a threshold engine temperature. The driver requested torque may be estimated and confirmation of an engine idle-stop may be initiated in response to a lower than threshold driver requested torque. Further, an emission control device coupled to the exhaust manifold of engine may be analyzed to determine that no request for engine restart was made.

If it is determined that engine idle-stop conditions are not met, at 306, current engine operations may be continued without initiating the engine start-stop operation, such as the engine may be maintained running with cylinders combusting fuel. If it is determined that engine idle-stop conditions are met, at 308, the routine includes determining if the generator is operated to power a power take off (PTO) device such as a cement mixer, a trash compactor, a harvester, a snow plough, a mobility device, etc. The PTO device may be coupled to a power box which may receive power from the generator. The generator may be operated to covert engine torque to electrical energy that is supplied to the power box. The power box may include one or more alternating current (AC) and/or direct current (DC) power outlets for performing tasks including but not limited to powering PTO device such as a cement mixer, a trash compactor, a harvester, a snow ploughs. The power box may be used for powering power tools at work sites, powering lighting, powering outdoor speakers, powering water pumps, supplying power in situations including emergency power outage, powering tailgating activities, powering RV camping activities, etc. Therefore, by operating the generator, engine power may be used to operate external electrical loads via the power box. When the generator is operated to power auxiliary electrical loads, the vehicle operator may select a mode of operation via the vehicle instrument panel termed "power to the box" or PttB mode. In the PttB mode, power from the generator may be utilized to operate off-board electrical load (s).

If it is determined that the generator is not operated to power an off-board load, it may be inferred that the vehicle is not currently being operated in the PttB mode and engine power is not desired for powering the power box. At 310, in response to the engine idle-stop conditions being met and the generator not being operated to power an off-board load, combustion may be suspended to shut-down the engine. In order to suspend combustion, fueling to the engine cylinders may be suspended. The controller may send a signal to one or more fuel injectors coupled to the engine cylinders to stop fuel injection to each of the cylinders. Also, the controller may send a signal to the spark plug coupled to each cylinder to disable spark. In addition, cylinder valve operation may be suspended. Once the combustion is suspended, the engine may spin-down and the engine speed may gradually decrease to zero.

If it is determined that even though the engine idle-stop conditions are met, the generator is being operated to power an off-board load, at 312, the routine may seek user input regarding engine shut-down via a human machine interface (HMI). In one example, a HMI such as touch screen may be housed in the vehicle dashboard (such as the instrument panel 196 in FIG. 1) and the HMI may display a message for the vehicle operator (user). In another example, the HMI may be a smart device (smart phone, tablet, etc.) display, a computer monitor, wherein the smart device/computer is communicatively coupled to the engine controller. The user may be outside the vehicle (have left the vehicle upon stopping the vehicle) and may receive the message on the smart phone screen. In the message, the user may be requested to indicate if the engine is to be stopped (since idle-stop conditions are met) or should the engine be continued to be operated (deactivate engine idle-stop). If (based on user input) the engine is stopped, the generator may no longer provide electrical energy to the power box and powering of the off-board load may have to be suspended. If (based on user input) the engine is continued to be operated (even when idle-stop conditions are met), the power box may be continued to be powered by generator operation and an off-board load may be continued to be supported. The user may also be asked to indicate if the user wants to deactivate engine idle-stop for a specific duration. The user may respond by selecting an option from the touchscreen.

Figure 4:
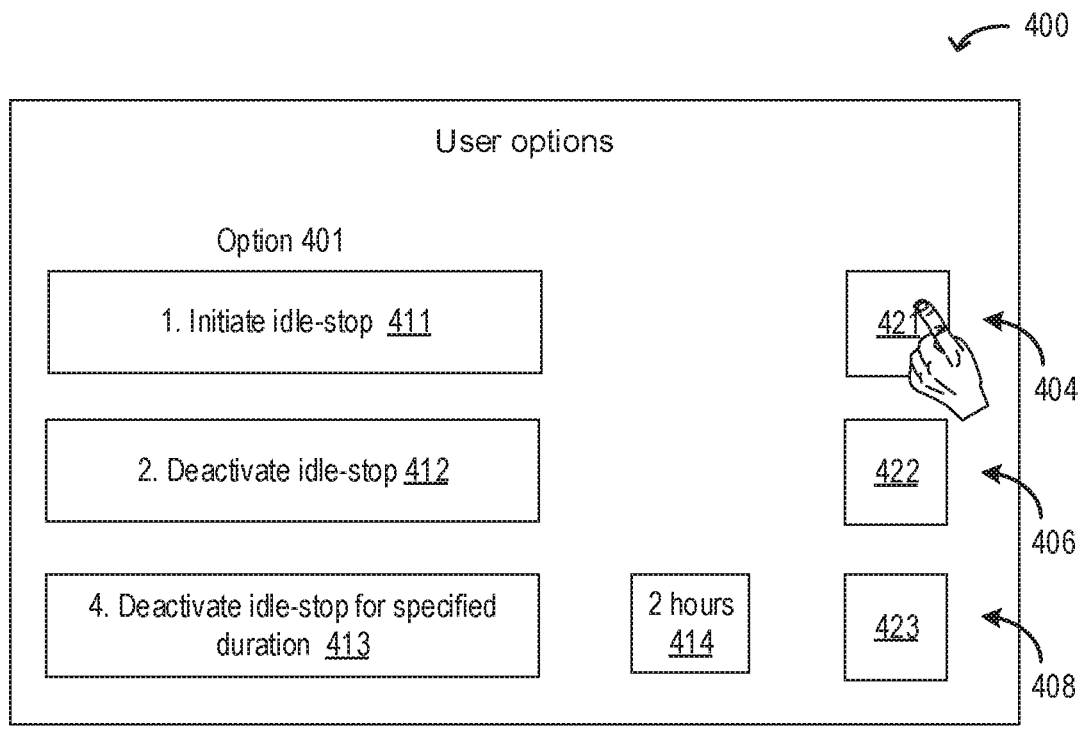
FIG. 4 shows an example human machine interface (HMI) for selection of idle-stop override by an operator.
Figure 5:
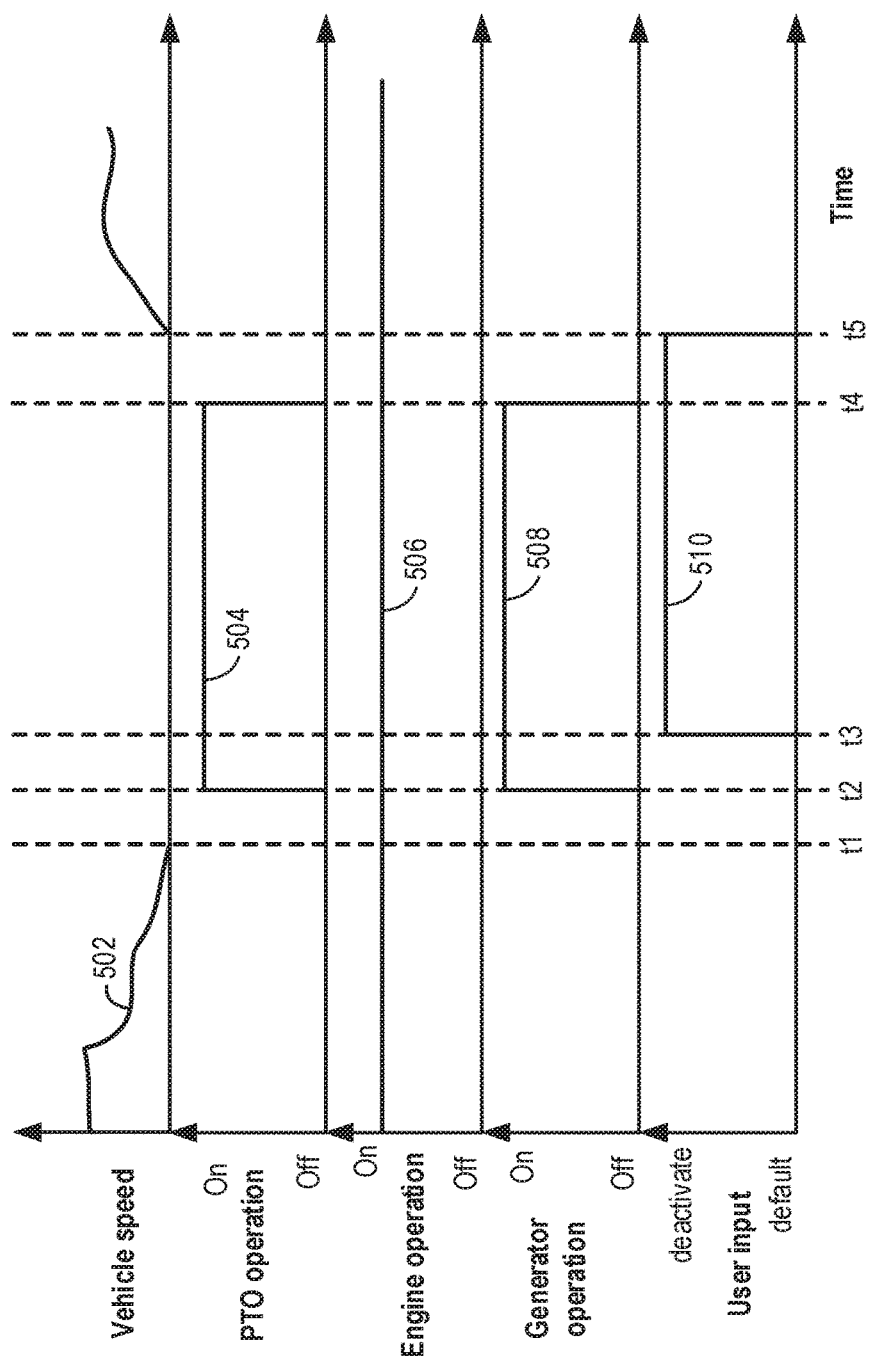
FIG. 5 shows an example operation of an engine and a generator based on user input.

Turning briefly to FIG. 4, it shows a screenshot 400 of an example screen of a human machine interface displaying the options for engine idle-stop scheduling to a user (such as the vehicle operator). Three options for scheduling the engine idle-stop are shown in rows 404, 404, and 406, respectively. These options are presented to the user when conditions for initiation of engine idle-stop are met while the generator is operated to power an off-board load via a power box. In the options column 401, a first box 411 indicates the option of initiating idle-stop right away, a second box 412 indicates the option of deactivating idle-stop until the vehicle is in motion and operation of the generator is discontinued, and a third box 413 indicates the option of deactivating idle-stop for a specified duration regardless of generator operation beyond the specified duration. The driver may select one of the three via corresponding boxes 421, 422, 423, respectively, included in each row. If the user selects the third option (box 413), the user may indicate the duration of time for which the idle-stop may be deactivated via an input to box 414. In this example, a duration of two hours is indicated.

Returning to FIG. 3, at 314, the user's input regarding engine shut-down when conditions for initiation of engine idle-stop are met while the generator is operated to power an off-board load is received via the HMI. At 316, the routine includes determining if engine idle-stop has been deactivated. The user may select to deactivate engine idle-stop such that even when conditions are met for engine idle-stop, the engine is continued to be operated and the engine power, converted to electrical energy via the generator, is used to power an off-board load via the power box.

If it is determined that the user has not indicated to deactivate engine idle-stop, it may be inferred that the user does not want to continue operating the engine for powering the off-board load. As an example, the off-board load may be a crop harvester which is operated only when the vehicle is moving. At 318, the generator operation may be discontinued and the engine may be shut-down by disabling fueling and spark to the engine cylinders.

If it is determined that the user has indicated to deactivate engine idle-stop, it may be inferred that the user wants to continue operating the engine for powering the off-board load. At 320, the routine includes determining if a duration of time has been indicated for deactivating engine idle stop. As an example, the off-board load may include a cement mixer which may be desired to be operated for a fixed time duration, regardless of vehicle motion, for optimal cement mixing. The user may indicate the duration for which the idle-stop deactivation is to be maintained (engine and generator to be operated). If it is determined that a duration for engine idle-stop deactivation has not been indicated, it may be inferred that the user wants to continue operating the engine for powering the off-board load via the power box. As an example, an off-board load may include a garbage compactor which may be desired to be operated when the vehicle is stationary and moving. Further, if at 314, a user input is not received while the generator is operated to power an external load (such as if the user is away from the vehicle and does not have access to the HMI), it may be inferred that the generator operation may be continued to be desired and the routine may proceed to step 324.

At 324, engine idle-stop may be deactivated until generator operation is suspended and the vehicle is in motion. The engine may be operated to generate power which may be converted by the generator for supply to the power box. When the generator operation is suspended and the vehicle is moved from its current position, it may be inferred that an off-board load at the current position may no longer desire to be powered and engine idle-stop deactivation may be nullified. In one example, the user may be notified via a message in the HMI that the engine idle-stop deactivation has been nullified and if during the drive cycle, engine idle-stop conditions are again met and the transmission gear position is shifted to park, regardless of the current engine idle-stop deactivation, a new user input may be sought.

In one example, the vehicle may be at a worksite and the generator may be used to power a device and upon completion of the work, the generator may be deactivated and the vehicle may be moved. As an example, the engine idle-stop deactivation may be nullified in response to the vehicle travelling a threshold distance (from the origin where engine idle stop was deactivated) as determined from a global positioning system (GPS) location of the vehicle (via an on-board navigation system) and/or completion of a threshold duration of drive (from the origin).

If at 320, it is determined that a duration of time has been indicated for deactivating engine idle stop, at 322, engine idle-stop may be deactivated for the specified duration. In one example, the duration may be 5 minutes. In another example, the duration may be 1 hour. The duration may be calculated from the time of indication (by the user) on the HMI. At the end of the specified duration, if the engine idle-stop conditions are still met, the generator may be deactivated and the engine may be shut-down.

Once the engine is shut-down, at step 310 or at step 322, the routine proceeds to step 326. At 326, the routine includes determining if engine restart conditions are met. In one example, engine idle-start (restart) conditions following an engine idle-stop may include an increase in engine load. In one example, the controller may determine if a brake pedal is released. The accelerator pedal position may also be determined, for example via a pedal position sensor, to determine whether the accelerator pedal has been engaged in addition to the release of the brake pedal. The status of the air conditioner may be checked to verify whether a request has been made to restart, as may be made when air conditioning is desired. The SOC of battery may be estimated to estimate if it is below a predetermined threshold. In one example, it may be desired that battery be at least 30% charged. Accordingly, engine starting may be requested to charge the battery to a desired value.

The engine restart conditions may further include, a request from an emission control device to restart the engine. In one example, the emission control device temperature may be estimated and/or measured by a temperature sensor, and if the temperature is below a predetermined threshold, an engine restart may be requested. The vehicle speed may be estimated and assessed whether it is above a predetermined threshold. For example, if the vehicle speed is greater than a threshold (e.g., 3 mph) an engine start may be requested. It may be determined whether the electrical load of the engine is above a predetermined threshold, in response to which an engine start is requested (e.g., to reduce draining of the battery). In one example, the electrical load may comprise one of various user operated accessory devices (such as a mobile phone, laptop, etc.), a defroster, windshield wipers, a music system, navigation system, electrically powered air-conditioning, etc.

If it is determined that the engine restart conditions have not been met, at 328, the engine may be maintained shut down and at rest, and combustion may not be resumed. The engine may be maintained at rest until conditions for engine restart are met.

If it is determined that engine restart conditions are met, at 330, the engine may be restarted. Upon engine restart, combustion may be resumed by initiating fueling to the engine cylinders. The controller may send a signal to an actuator coupled to the starter motor to crank the engine using energy from the battery until an engine idling speed is reached. Also, the controller may send a signal to one or more fuel injectors coupled to the engine cylinders to restart fuel injection to each of the cylinders. Further, the controller may send a signal to the spark plug coupled to each cylinder to enable spark. During engine restart, the transmission position may be maintained at the current transmission position (such as drive, neutral, or reverse).

In this way, during operation of an on-board generator to supply electric power to off-board electric consumers, upon receipt of a first user input, stopping an idling engine may be inhibited after a predetermined amount of time, and upon receipt of a second user input, the idling engine may be automatically stopped after the predetermined amount of time. Also, upon receipt of a third user input, stopping the idling engine may be postponed after the predetermined amount of time, and after an indicated duration, the idling engine may be stopped, the third user input specifying the indicated duration.

FIG. 5 shows an example operating sequence 500 illustrating operation of an engine and a generator to power a power take-off device (such as auxiliary loads 193 in FIG. 1). The horizontal (x-axis) denotes time and the vertical markers t1-t5 identify significant times in engine operation.

The first plot, line 502, shows a change in vehicle speed over time. The second plot, line 504, shows operation of the power take-off (PTO) device using power generated by the engine. Mechanical energy generated by the engine is converted to electrical energy at the generator which is then used to operate the PTO via a power box. Therefore, operation of the generator is desired during operation of the PTO device. The third plot, line 506, shows engine operation. Engine operation includes combustion of air fuel in the engine cylinders. The fourth plot, line 508, shows operation of the on-board generator to convert engine torque to electrical energy. The fifth plot, line 510, denotes user input to deactivate (override) an idle-stop. During vehicle operation, by default, the idle-stop status is on such that when conditions are met for engine idle-stop, the engine is shut-down. However, based on user input, the idle-stop status may be turned off (idle-stop deactivated) such that even when conditions are met for engine idle-stop, the engine is continued to be operated to generate energy.

Prior to time t1, the vehicle is operated using engine torque. The generator is not operated during this time. At time t1, the vehicle is stopped while the engine is continued to be operated. At time t2, a power take off device is connected to the power box and the generator is activated to power the PTO device via the power box. Mechanical energy converted to electrical energy via the generator is used to operate the PTO device.

At time t3, conditions are met for an engine idle-stop, and an input from the vehicle operator is sought. Based on the user's indication of idle-stop deactivation, even though conditions are met for shutting down the engine at time t3, the engine is continued to be operated to supply energy to the generator. Between time t3 and t4, the PTO is operated. At time t4, the PTO operation is suspended and also the generator is deactivated. The vehicle continues to be at rest with the engine combusting between time t4 and t5. At time t5, the vehicle is restarted from rest. In response to the generator shut-down and the vehicle motion, the user's deactivation of engine idle-stop is nullified and during the drive cycle, if conditions are met for an engine idle-stop, the engine may be idle-stopped if the generator is not operating. If the generator is operating when the idle-stop conditions are met during the drive cycle, the user will be prompted to either maintain the default state and proceed with the idle-stop or deactivate idle-stop again.

In this way, upon engine idle-stop conditions being met, by continuing to operate the engine during generator operation based on user preference, operation of a power take-off device powered by the generator may be continued without irruption. Overall, by scheduling engine idle-stop based on generator operation and operator input, customer satisfaction may be improved.

In one example, a method for a vehicle, comprises: during operation of a generator, in response to a condition for an engine idle-stop being met, schedule engine shut-down based on input from a user. The preceding example method further comprises, additionally or optionally, during operation of the generator, in response to the condition for the engine idle-stop being met, prompting the user for the input via a human machine interface (HMI), the HMI including a display coupled to a vehicle dashboard and/or a display of a smart phone operated by the user. In any or all of the preceding examples, additionally or optionally, scheduling the engine shut-down includes continuing operation of an engine without engine shut-down based on a first input from the user while continuing providing generator output to an external device that is separate and distinct from the vehicle or any on-board vehicle accessory. In any or all of the preceding examples, the method further comprising, additionally or optionally, upon receipt of the first input, the engine is continued to be operated until the generator is deactivated and the vehicle is moved from an origin location. In any or all of the preceding examples, additionally or optionally, the moving of the vehicle includes shifting a gear position from park to a forward gear and moving the vehicle higher than a threshold distance from the origin location. In any or all of the preceding examples, additionally or optionally, scheduling the engine shut-down further includes shutting down the engine based on a second input from the user. In any or all of the preceding examples, additionally or optionally, shutting down the engine includes deactivating fuel injection and spark to each of the engine cylinders. In any or all of the preceding examples, additionally or optionally, scheduling the engine shut-down further includes continuing engine operation without engine shut-down for an indicated duration based on a third input from the user. In any or all of the preceding examples, the method further comprising, additionally or optionally, upon receipt of the third input, continuing operation of the engine for the indicated duration, and upon completion of the indicated duration, in response to the condition of the engine idle-stop being met, shutting down the engine regardless of generator operation. In any or all of the preceding examples, additionally or optionally, the user indicating one of the first input, the second input, and the third input is in response to the prompting the user for the input via the HMI. In any or all of the preceding examples, additionally or optionally, the condition for the engine idle-stop includes a higher than threshold duration of engine idling with the vehicle stopped at the origin location. In any or all of the preceding examples, additionally or optionally, the generator is providing power to the external device via a power box including power outlets.

Another example method for a vehicle comprises: during operation of an on-board generator to supply electric power to off-board electric consumers, upon receipt of a first user input, inhibiting stopping an idling engine after a predetermined amount of time, and upon receipt of a second user input, automatically stopping the idling engine after the predetermined amount of time. In the preceding example method, additionally or optionally, the inhibiting is continued until operation of the on-board generator is suspended and the vehicle is moved from a current location. In any or all of the preceding examples, additionally or optionally, the first user input and the second user input are received from a user via a human machine interface (HMI), the user being inside the vehicle or external to the vehicle. In any or all of the preceding examples, the method further comprising, additionally or optionally, automatically stopping the idling engine after the predetermined amount of time when the on-board generator is not supplying electric power to off-board electric consumers. In any or all of the preceding examples, the method further comprising, additionally or optionally, upon receipt of a third user input, postponing stopping the idling engine after the predetermined amount of time, and after an indicated duration, stopping the idling engine, wherein the third user input specifies the indicated duration.

In yet another example, a system for a vehicle, comprises: a controller with computer readable instructions stored on non-transitory memory to: during operation of an on-board generator to power one or more loads external to the vehicle, after a threshold duration of engine idling with the vehicle being stationary, seeking user response via a human machine interface (HMI), in response to the user overriding an engine idle-stop, maintaining engine operation, and in response to the user not overriding the engine idle-stop, suspending fueling and spark to engine cylinders to shut down engine. In the preceding example system, additionally or optionally, the one or more loads are supplied power from an engine via the generator and a power box, wherein the generator generates alternating current (AC) power from engine torque, and wherein power box includes one or more outlets for supplying electricity to the one or more load. In any or all of the preceding examples, additionally or optionally, the HMI is one or more of a vehicle instrument panel coupled inside a vehicle cabin, a display of a smart device, and a monitor of a computer.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle, comprising:
during operation of a generator, in response to a condition for an engine idle-stop being met, schedule engine shut-down based on input from a user.

2. The method of claim 1, further comprising, during operation of the generator, in response to the condition for the engine idle-stop being met, prompting the user for the input via a human machine interface (HMI), the HMI including a display coupled to a vehicle dashboard and/or a display of a smart phone operated by the user.

3. The method of claim 1, wherein scheduling the engine shut-down includes continuing operation of an engine without engine shut-down based on a first input from the user while continuing providing generator output to an external device that is separate and distinct from the vehicle or any on-board vehicle accessory.

4. The method of claim 3, further comprising, upon receipt of the first input, the engine is continued to be operated until the generator is deactivated and the vehicle is moved from an origin location.

5. The method of claim 4, wherein the moving of the vehicle includes shifting a gear position from park to a forward gear and moving the vehicle higher than a threshold distance from the origin location.

6. The method of claim 1, wherein scheduling the engine shut-down further includes shutting down the engine based on a second input from the user.

7. The method of claim 6, wherein shutting down the engine includes deactivating fuel injection and spark to each of the engine cylinders.

8. The method of claim 2, wherein scheduling the engine shut-down further includes continuing engine operation without engine shut-down for an indicated duration based on a third input from the user.

9. The method of claim 8, further comprising, upon receipt of the third input, continuing operation of the engine for the indicated duration, and upon completion of the indicated duration, in response to the condition of the engine idle-stop being met, shutting down the engine regardless of generator operation.

10. The method of claim 8, wherein the user indicating one of the first input, the second input, and the third input is in response to the prompting the user for the input via the HMI.

11. The method of claim 4, wherein the condition for the engine idle-stop includes a higher than threshold duration of engine idling with the vehicle stopped at the origin location.

12. The method of claim 3, wherein the generator is providing power to the external device via a power box including power outlets.

13. An operating method for a vehicle, comprising:
during operation of an on-board generator to supply electric power to off-board electric consumers,
upon receipt of a first user input, inhibiting stopping an idling engine after a predetermined amount of time; and
upon receipt of a second user input, automatically stopping the idling engine after the predetermined amount of time.

14. The method of claim 13, wherein the inhibiting is continued until operation of the on-board generator is suspended and the vehicle is moved from a current location.

15. The method of claim 13, wherein the first user input and the second user input are received from a user via a human machine interface (HMI), the user being inside the vehicle or external to the vehicle.

16. The method of claim 13, further comprising, automatically stopping the idling engine after the predetermined amount of time when the on-board generator is not supplying electric power to off-board electric consumers.

17. The method of claim 13, further comprising, upon receipt of a third user input, postponing stopping the idling engine after the predetermined amount of time, and after an indicated duration, stopping the idling engine, wherein the third user input specifies the indicated duration.

18. A system for a vehicle, comprising:
a controller with computer readable instructions stored on non-transitory memory to:
during operation of an on-board generator to power one or more loads external to the vehicle,
after a threshold duration of engine idling with the vehicle being stationary, seeking user response via a human machine interface (HMI),
in response to the user overriding an engine idle-stop, maintaining engine operation; and
in response to the user not overriding the engine idle-stop, suspending fueling and spark to engine cylinders to shut down engine.

19. The system of claim 18, wherein the one or more loads are supplied power from an engine via the generator and a power box, wherein the generator generates alternating current (AC) power from engine torque, and wherein power box includes one or more outlets for supplying electricity to the one or more load.

20. The system of claim 18, wherein the HMI is one or more of a vehicle instrument panel coupled inside a vehicle cabin, a display of a smart device, and a monitor of a computer.

* * * * *